June 6, 1961 R. E. HARTSOUGH 2,987,039
POULTRY HOUSE FLOORING
Filed June 27, 1958 2 Sheets-Sheet 1

INVENTOR.
RUSSELL E. HARTSOUGH
BY M. A. Hobbs
ATTORNEY

June 6, 1961 R. E. HARTSOUGH 2,987,039
POULTRY HOUSE FLOORING
Filed June 27, 1958 2 Sheets-Sheet 2
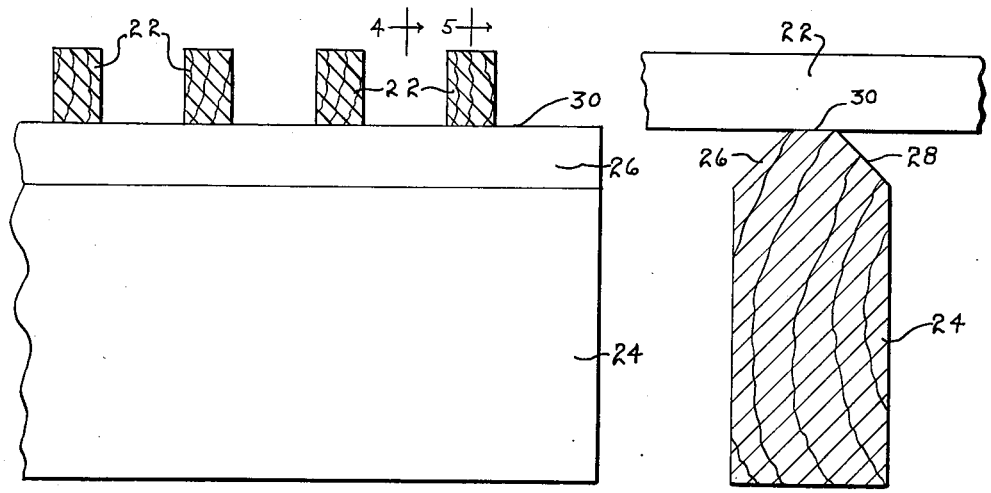
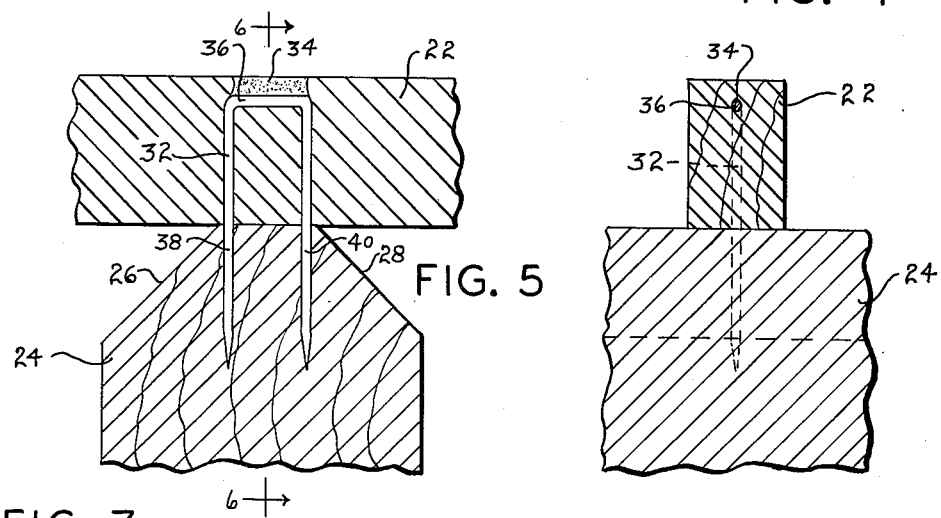
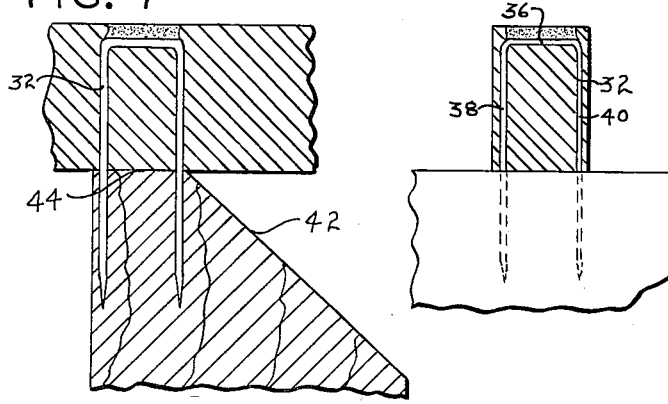
INVENTOR.
RUSSELL E. HARTSOUGH
BY M. A. Hobbs
ATTORNEY

United States Patent Office 2,987,039
Patented June 6, 1961

2,987,039
POULTRY HOUSE FLOORING
Russell E. Hartsough, Hartsough Mfg. Co., Walkerton, Ind.
Filed June 27, 1958, Ser. No. 745,200
7 Claims. (Cl. 119—22)

The present invention relates to floors and more particularly to flooring for poultry houses and the like.

In the raising of poultry, cleanliness of the floor in the feeding area is important to the health of the flock. Various types of flooring which facilitate cleaning and maintaining cleanliness have been used, one of the most common being perforated sections of wire or slats. These have the inherent disadvantage of having exposed metal parts including supports and connecting fixtures which readily become corroded from the acid in the poultry droppings, and consequently must be constantly repaired and often replaced. It is therefore one of the primary objects of the present invention to provide a durable self-cleaning flooring with no exposed metal parts, supports or fixtures to become corroded.

Another object of the invention is to provide a prefabricated, self-cleaning poultry house flooring which can readily be assembled at the fabricating plant, shipped and installed in sections in poultry house and the like without the use of exposed nails, bolts, or other fixtures.

Still another object of the invention is to provide a poultry house flooring which sheds the droppings, litter and the like and constantly maintains the feeding and living area in a clean, healthy condition for the raising of poultry.

A further object is to provide a sturdy, slat-type flooring for poultry houses, which is resistant to wear and deterioration and which can be readily repaired, reconditioned and replaced if required.

Additional objects and advantages will become apparent from the following description and accompanying drawings, wherein:

FIGURE 3 is an enlarged cross-section view of the flooring taken on line 3—3 of FIGURE 2;

FIGURE 4 is a cross-sectional view of a portion of the flooring taken on line 4—4 of FIGURE 3;

FIGURE 5 is a further enlarged fragmentary view of the flooring showing details in the construction thereof, the section being taken on line 5—5 of FIGURE 3;

FIGURE 6 is a fragmentary cross-sectional view of the flooring taken on line 6—6 of FIGURE 5;

FIGURE 7 is a fragmentary vertical cross-sectional view of a modified form of my poultry house flooring; and FIGURE 8 is a fragmentary and partial cross-sectional view of a further modification of my flooring.

Figure 1:
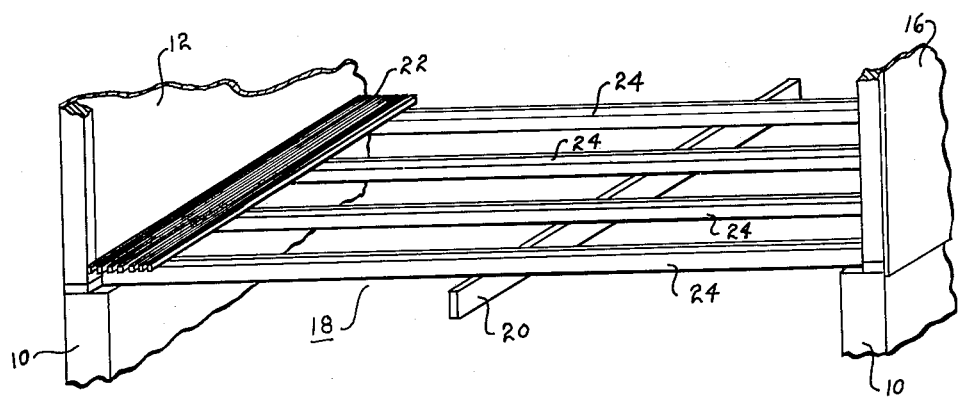
FIGURE 1 is a fragmentary, perspective view of a poultry house, showing a section of the present flooring installed therein.
Figure 2:
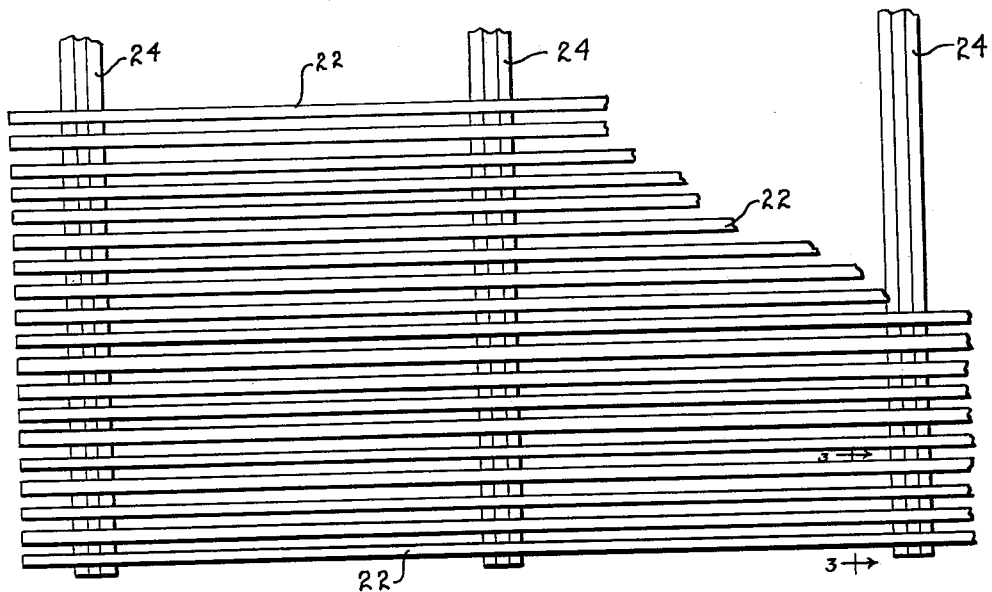
FIGURE 2 is a top plan view of a portion or section of my flooring with a portion being broken away to better show the construction.

Referring more specifically to the drawings, numeral 10 designates a concrete foundation of a poultry house, 12 and 16 walls of the house resting on the foundation, and 18 a section of my poultry house flooring shown installed in the house and supported on the inner edge of the upper surface of foundation 10. With the exception of the present flooring the poultry house referred to may be considered conventional for the purpose of the description, the only possible change required being supports for the flooring; however, standard beams or floor supports may be suitable for the present flooring. In FIGURE 1 the section of flooring in addition to being supported at the outside ends on the foundation is supported at the center of the building on a beam 20 which in turn is supported by the foundation.

The present invention is directed to the construction of the flooring section which in the embodiment shown in the drawings consists of a series of long, relatively narrow wooden slats 22 secured to and supported by wooden cross members 24. The exact size and shape of slats 22 are not critical; however, the preferred dimensions are approximately one-half inch in width and three-quarters of an inch in height and these slats are preferably spaced about seven-eighths of an inch apart. The supporting cross members 24 in this particular embodiment are approximately two inches in width and four inches in height and are provided with beveled longitudinal corners to provide steeply sloping surfaces 26 and 28 for shedding litter and droppings falling thereon from between slats 22. A longitudinal land 30 is provided on the upper surface of members 24 to give a firm footing for slats 22, said land preferably being as narrow as possible consistent with the required footing for the slats so that no substantial area is provided on the upper surface of member 24 for the accumulation of litter and droppings. A convenient sized section 18 is five feet in the longitudinal direction of slats 22 and preferably between eight and twelve feet in the direction of cross members 24, the cross members being spaced approximately seventeen inches apart and inwardly from the ends of the slats by about three inches. The wooden slats and cross member are preferably treated with a wood preservative and/or disinfectant before being assembled.

Since the flooring is used to support heavy moving objects, including persons servicing and cleaning the poultry house, slats 22 must be securely attached to cross members 24 and the attaching means must be protected from the corrosive conditions normally existing in poultry houses if satisfactory life of the flooring is to be obtained. One of the main features of the present invention is the manner of securing slats 22 to cross members 24. Metal staples 32 of the type shown in FIGURES 5 through 8 are particularly adapted for the present flooring since the staples are completely embedded beneath the surface of the slat with the wood of the slat defining the hole through which the staple entered, closing together and sealing the staple within the wood, as shown at numeral 34. The most effective seal at point 34 is obtained when the staple is placed in the slat with the horizontal part 36 of the staple parallel with the grain which is normally parallel or substantially parallel with the grain of the wood used to make the slat. Embedding of the staple in the wood in this manner protects the metal staples from the corrosive poultry droppings as well as prevents the staples from being worn by abrasion from the objects moved over the upper surface of the flooring. Further, the two prongs 38 and 40 and horizontal section 36 grip the wood firmly and prevent the slats from tilting, rocking or otherwise being loosened by the moving objects.

Modified forms of the present invention are illustrated in FIGURES 7 and 8. In FIGURE 7, the sloping upper surface 42 of the cross member is entirely on one side and the land 44 for supporting the slats is along one edge. The slats are attached in the same manner as previously described, with the horizontal part 36 of the staple being parallel with the grain and with the length of the slat. In FIGURE 8 the cross member may be either the type shown in FIGURES 1 through 6 or the type shown in FIGURE 7. With the staple in the position shown in FIGURE 8 the two prongs 38 and 40 tend to give greater stability to the slats; however, with this arrangement an effective seal at the hole through which horizontal part 36 passes is more difficult to obtain since the fibers of the wood are broken as the staple is driven downwardly cross-grain from the surface of the slat.

It is seen from all the embodiments of the present invention disclosed herein that poultry droppings and litter will readily fall downwardly between the slats and any falling on the cross member 24 will roll or fall from sloping surfaces 26 and 28 or 42, thus maintaining the floor in a clean condition for the poultry. Sections 18 are preferabricated of a size which can readily be handled by two men and can easily be shipped and laid in the poultry house as a unit.

While several modifications have been illustrated herein, various other modifications and changes can be made without departing from the scope of the present invention.

I claim:

1. A section of poultry house flooring, comprising a plurality of wooden slats with flat upper surfaces and of a width of about one-half of an inch and of a height of about three-quarters of an inch spaced laterally about one inch apart, spaced cross members arranged transversely of and supporting said slats, said cross members being about two inches in width and four inches in height and having a longitudinal flat portion in the center of the upper surface for receiving said slats and steep sloping surfaces extending downwardly and outwardly from said flat portion, and metal members having two parallel spaced prongs extending downwardly through said slats into said cross members and a straight portion connecting said prongs and being parallel to and being embedded in the slat and sealed from the upper surface thereof.

2. A section of poultry house flooring, comprising a plurality of wooden slats with substantially flat upper surfaces and of a width of about one-half of an inch and of a height of about three-quarters of an inch spaced laterally about one inch apart, spaced cross members arranged transversely of and supporting said slats, said cross members being about two inches in width and four inches in height having a longitudinal flat portion on the upper surface for receiving said slats and sloping surfaces extending downwardly and outwardly from said flat portion, and metal members having two parallel spaced prongs extending downwardly through said slats into said cross members and a straight portion connecting said prongs and being embedded in the slat and sealed from the upper surface thereof.

3. A section of poultry house flooring, comprising a plurality of wooden slats spaced laterally from one another and having substantially flat upper surfaces, spaced cross members arranged transversely of and supporting said slats, said cross members having a longitudinal flat portion in the center of the upper surface for receiving said slats and steep sloping surfaces extending downwardly and outwardly from said flat portion, and metal members having two parallel spaced prongs extending downwardly through said slats into said cross members and a straight portion connecting said prongs and being parallel to and being embedded in the slat and sealed from the upper surface thereof.

4. A section of poultry house flooring, comprising a plurality of wooden slats spaced laterally from one another and having substantially flat upper surfaces, spaced cross members arranged transversely of and supporting said slats, said cross members having a longitudinal flat portion on the upper surface for receiving said slats and sloping surfaces extending downwardly and outwardly from said flat portion, and metal members having two parallel spaced prongs extending downwardly through said slats into said cross members and a portion connecting said prongs and being parallel to and being embedded in the slat and sealed from the upper surface thereof.

5. A section of poultry house flooring, comprising a plurality of wooden slats spaced laterally from one another and having substantially flat upper surfaces, spaced cross members arranged transversely of and supporting said slats and having an upper surface, said cross members having surfaces extending downwardly and outwardly from said upper surface, and metal members having two spaced prongs extending downwardly through said slats into said cross members and a portion connecting said prongs and being embedded in the slat.

6. A section of poultry house flooring comprising a plurality of wooden slats spaced laterally from one another and having substantially flat upper surfaces, spaced cross members arranged transversely of and supporting said slats and having an upper surface, said cross members having surfaces extending downwardly and outwardly from said upper surface, and U-shaped staples extending downwardly through said slats into said cross members, the upper portion of said staples being fully embedded in the slat.

7. A section of poultry house flooring, comprising a plurality of wooden slats spaced laterally from one another and having substantially flat upper surfaces, spaced cross members arranged transversely of and supporting said slats, said cross members having a longitudinal flat portion on the upper suface for receiving said slats and a steep sloping surface extending downwardly and outwardly from said flat portion, and U-shaped staples extending downwardly through said slats into said cross members, the upper portion of said staples being fully embedded in the slat.

References Cited in the file of this patent

UNITED STATES PATENTS

| | | |
|---|---|---|
| 165,889 | Stitt | July 20, 1875 |
| 1,301,321 | Reagan | Apr. 22, 1919 |
| 1,627,268 | Bouma | May 3, 1927 |
| 1,675,226 | Munroe et al. | June 26, 1928 |
| 1,684,608 | Thumman | Sept. 18, 1928 |
| 2,753,841 | Hawkins | July 10, 1956 |

FOREIGN PATENTS

| | | |
|---|---|---|
| 356,379 | Great Britain | Sept. 10, 1931 |